(12) United States Patent
Nicolis (10) Patent No.: US 12,443,052 B2
(45) Date of Patent: Oct. 14, 2025

(54) EYEGLASSES WITH SIMPLIFIED HINGE FOR TEMPLE

(71) Applicant: LUXOTTICA S.R.L., Agordo (IT)

(72) Inventor: Diego Nicolis, Grezzana (IT)

(73) Assignee: LUXOTTICA S.R.L., Agordo (IT)

( * ) Notice: Subject to any disclaimer, the term of this patent is extended or adjusted under 35 U.S.C. 154(b) by 665 days.

(21) Appl. No.: 17/627,983

(22) PCT Filed: Jul. 7, 2020

(86) PCT No.: PCT/EP2020/069072
§ 371 (c)(1),
(2) Date: Jan. 18, 2022

(87) PCT Pub. No.: WO2021/008934
PCT Pub. Date: Jan. 21, 2021

(65) Prior Publication Data
US 2022/0276505 A1    Sep. 1, 2022

(30) Foreign Application Priority Data

Jul. 18, 2019   (IT) .................. 102019000012234

(51) Int. Cl.
*G02C 1/02*     (2006.01)
*A61F 9/02*     (2006.01)
(Continued)

(52) U.S. Cl.
CPC .................. *G02C 5/2209* (2013.01)

(58) Field of Classification Search
CPC ........... A61F 9/026; G02C 5/006; G02C 5/20; G02C 5/143; G02C 5/06; G02C 1/02; G02C 5/22; G02C 5/16
(Continued)

(56) References Cited

U.S. PATENT DOCUMENTS 5,764,330 A * 6/1998 Simioni ............... G02C 5/2209
                                                      351/149
7,338,157 B1 * 3/2008 Leung ................. G02C 5/2209
                                                      351/153
(Continued)

FOREIGN PATENT DOCUMENTS

CN      109121562 A    1/2019
EP         0690331 A1    1/1996
(Continued)

OTHER PUBLICATIONS

Japanese Office Action for Japanese Application No. 2022-502925, dated Feb. 6, 2020, 12 pages with translation.
(Continued)

*Primary Examiner* — Dawayne Pinkney
(74) *Attorney, Agent, or Firm* — CANTOR COLBURN LLP (57) ABSTRACT

Eyeglasses with a simplified hinge, having a front of the eyeglasses and a pair of temples, with a cavity is defined in the front for accommodating a retention and locking element which is adapted to be engaged by a hook-shaped portion of one end of each one of the temples. The retention and locking element is adapted to be accommodated in the cavity of the front, when it is coupled to the hook-shaped end of the temple, in order to couple the temple to the front.

10 Claims, 11 Drawing Sheets

(51) Int. Cl.
*G02C 5/14* (2006.01)
*G02C 5/22* (2006.01)

(58) Field of Classification Search
USPC .......... 351/140, 41, 163, 111, 115, 116, 121, 351/153; 16/228
See application file for complete search history.

(56) References Cited

U.S. PATENT DOCUMENTS

| | | | |
|---|---|---|---|
| 8,757,798 B2* | 6/2014 | Cody | G02C 1/08 351/153 |
| 9,678,360 B2 | 6/2017 | Young | |
| 2008/0227326 A1 | 9/2008 | Hsu | |
| 2012/0327360 A1* | 12/2012 | Lin | G02C 5/2209 351/121 |
| 2014/0333888 A1 | 11/2014 | Tsai | |
| 2016/0033790 A1 | 2/2016 | Young | |

FOREIGN PATENT DOCUMENTS

| | | | |
|---|---|---|---|
| EP | 3462229 A1 | 4/2019 | |
| JP | 2001021845 A | 1/2001 | |
| KR | 20150144522 A | 12/2015 | |
| KR | 101609456 B1 | 4/2016 | |
| WO | WO-2014107010 A1 * | 7/2014 | ............... G02C 1/08 |

OTHER PUBLICATIONS

International Search Report issued Sep. 21, 2020 re: Application No. PCT/EP2020/069072, pp. 1-4, citing: KR 101 609 456 B1, U.S. Pat. No. 9,678,360 B2, EP 0 690 331 A1, US 2014/0333888 A1 and EP 3 462 229 A1.

IT Search Report issued Mar. 13, 2020 re: Application No. 201900012234, pp. 1-9, citing: KR 101 609 456 B1, U.S. Pat. No. 9,678,360 B2, EP 0 690 331 A1, US 2014/0333888 A1 and EP 3 462 229 A1.

Written Opinion issued Sep. 21, 2020 re: Application No. PCT/EP2020/069072, pp. 1-7, citing: KR 101 609 456 B1, U.S. Pat. No. 9,678,360 B2, EP 0 690 331 A1, US 2014/0333888 A1 and EP 3 462 229 A1.

European Office Action for Application No. 20736706.1, dated Mar. 4, 2024, 7 pages.

Japanese Office Action for Application No. 2022-502925, dated Aug. 19, 2024, 8 pages with translation.

* cited by examiner

EYEGLASSES WITH SIMPLIFIED HINGE FOR TEMPLE

TECHNICAL FIELD

The present disclosure relates to eyeglasses with a simplified hinge for a temple. More specifically, the disclosure relates to eyeglasses with a hinge that makes it possible to connect the temple to the eyeglasses in a simplified manner.

BACKGROUND

As is known, the connection between a temple and the eyeglasses, or rather the front of the eyeglasses, occurs by way of a hinge that connects the front of the eyeglasses to one end of the temple. The coupling between the front and the temple by way of the hinge usually entails the use of small components, such as screws, bushings, rivets, etc. which make such a connection possible.

The use of screws generally constitutes a problem if the user has to is dismantle the temple as it is often necessary to avail of a specialist optician. In addition such components can be subjected to wear, and may be lost by the user of the eyeglasses.

In other cases spot welds can be used, which can be critical for the finishing processes, as they result in an unevenness of the surface which can have an impact on the appearance of the hinge.

In any case, the connection between the temple and the front of the eyeglasses can be delicate owing to the fact that the hinge is a component that is often subjected to significant stresses following repeated openings and closings of the hinge, as well as over-opening the temple outside the front of the eyeglasses.

In order to have good levels of structural performance, such component often has dimensions that are such as to have an impact on the appearance of the temple and of the eyeglasses in their entirety.

In fact for temples with minimal appearance and reduced diameter, the presence of a hinge of large dimensions can spoil the intended design.

SUMMARY

The aim of the present disclosure is to provide eyeglasses in which the connection hinge between the front and the temple of the eyeglasses is provided so as to not require the use of components, such as screws, rivets, bushings etc., for the coupling between the temple and the front.

Within this aim, the present disclosure provides eyeglasses in which the temple can be coupled to the front of the eyeglasses with a hinge that is integrated in the front of the eyeglasses.

The present disclosure also provides eyeglasses in which the connection hinge between the front and the temple of the eyeglasses is provided so as to not require the use of spot welds or adhesive bonding for the coupling between the temple and the front.

The present disclosure further provides eyeglasses in which the temple can be coupled to the front of the eyeglasses with a hinge by way of a is simple and rapid process that does not have an impact on production times.

The present disclosure provides eyeglasses that have a hinge that is extremely robust and therefore the coupling between the temple and the front of the eyeglasses can be subjected to abuse without risking breakage.

The present disclosure further provides eyeglasses in which the connecting hinge between the temple and the front has a minimal impact on the appearance of the eyeglasses in their entirety.

The present disclosure also provides eyeglasses in which the connecting hinge between the temple and the front harmonizes with the appearance of the front and can optionally constitute an embellishment of it.

The present disclosure provides eyeglasses that are highly reliable, easily and practically implemented and low cost.

This aim and these and other advantages which will become better apparent hereinafter are achieved by providing eyeglasses with a simplified hinge, comprising a front of the eyeglasses and a pair of temples, characterized in that a cavity is defined in said front for accommodating a retention and locking element which is adapted to be engaged by a hook-shaped portion of one end of each one of said temples, said retention and locking element being adapted to be accommodated in said cavity of said front, when it is coupled to said hook-shaped end of the temple, in order to couple said temple to said front.

BRIEF DESCRIPTION OF THE DRAWINGS

Further characteristics and advantages of the disclosure will become better apparent from the description of preferred, but not exclusive, embodiments of the eyeglasses according to the disclosure, which are illustrated by way of non-limiting example in the accompanying drawings wherein.

DETAILED DESCRIPTION OF THE DRAWINGS

Figure 1:
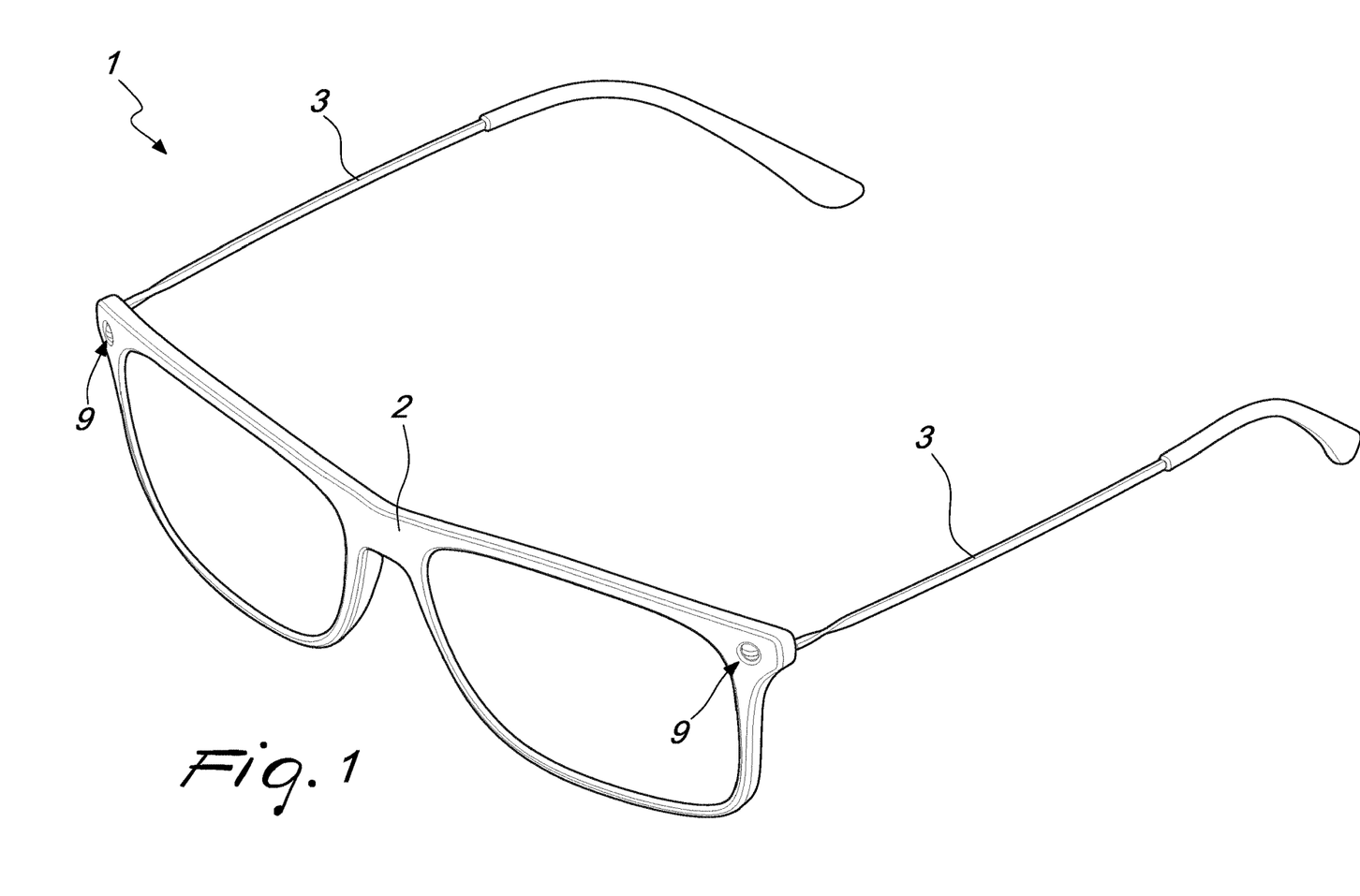
FIG. 1 is a perspective view of a first embodiment of the eyeglasses according to the present disclosure.

With reference to the figures, in which identical reference numerals designate identical elements, the eyeglasses according to the disclosure, generally designated by the reference numeral 1, comprise, in a first embodiment thereof, a front 2 which is adapted to be coupled to a pair of temples 3.

Figure 2:
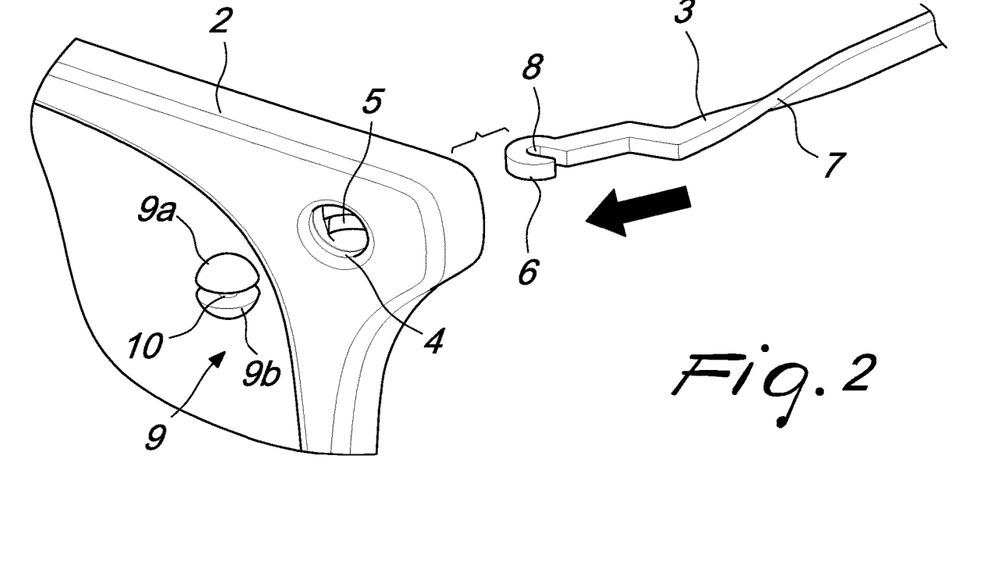
FIG. 2 is an exploded perspective view of a detail of the first step of connection between the temple and the front of the eyeglasses according to the disclosure.
Figure 3:
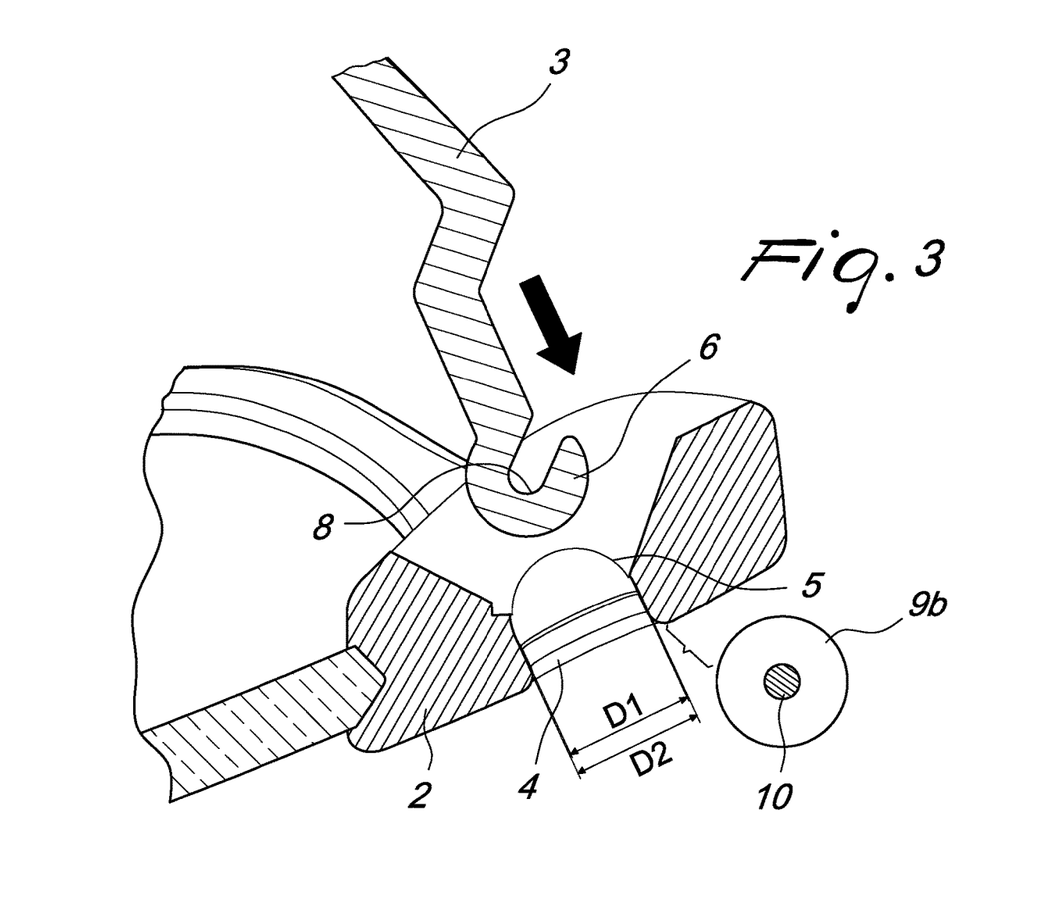
FIG. 3 is a partially cross-sectional perspective view of the first step of connection between the temple and the front of the eyeglasses according to the disclosure.

The coupling between the front 2 and the temples 3 occurs by virtue of the presence, in the front 3, of a substantially semicircular cavity or seat 4 which is provided with a slot 5 at its bottom region.

Conveniently, the temple 3 is shaped with one end like a hook 6. The temple 3 is conveniently twisted with a torsion 7 so that the hook-shaped portion 6 is arranged on the horizontal plane while the body of the temple, the opposite end of which will be placed on the ears of the user, is twisted and belongs to a plane perpendicular to the plane on which the hook-shaped portion 6 is defined.

The hook-shaped portion 6 is shaped so as to have a cavity 8 with the faces substantially parallel 8.

Conveniently, the hinge is made with a retention and locking element, for example a substantially spherical element 9, which is composed of two hemispheres 9a and 9b, which are mutually coupled by a pin 10. The pin 10 is adapted to engage the cavity 8 of the temple 3 and in particular the hook-shaped portion 6 of that temple.

The substantially spherical element 9 is adapted to be accommodated within the cavity 4.

FIGS. 2 to 8 show the method of attaching the temple 3 to the front 2 of the eyeglasses. Conveniently, in this embodiment, the cavity 4 is defined at the front region of the front 2.

Figures 4, 5:
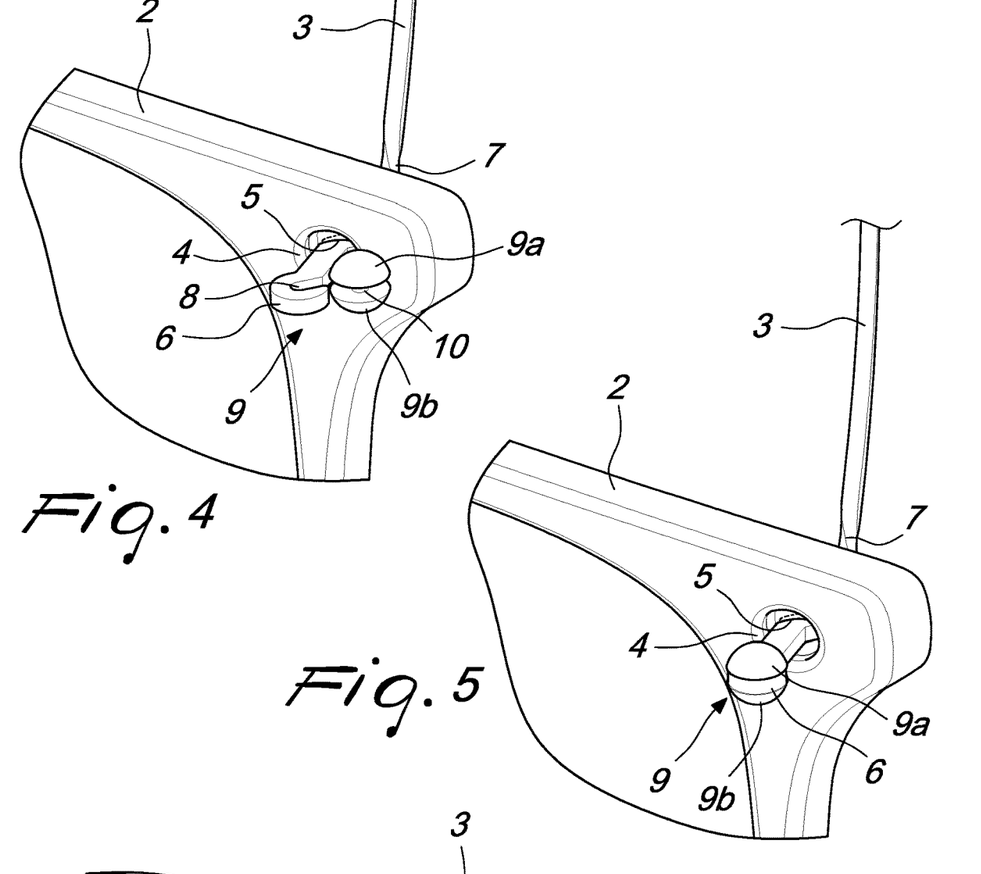
FIG. 4 is a perspective partial view of a second step of coupling between the temple and the front of the eyeglasses, which follows the step shown in FIG. 2.
FIG. 5 shows a third step of coupling between the temple and the front of the eyeglasses.
Figure 6:
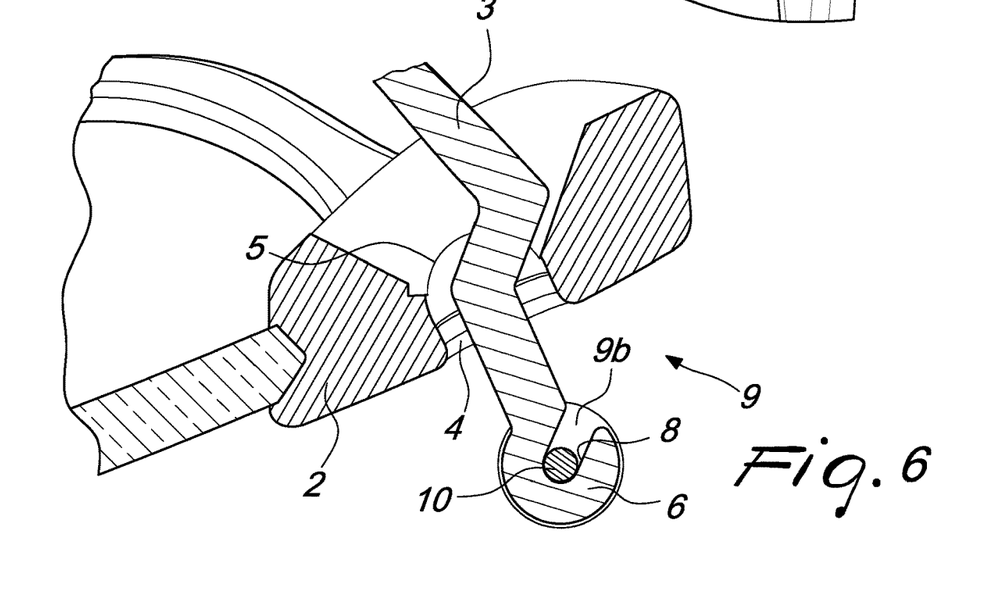
FIG. 6 is a partially cross-sectional perspective view of the coupling of FIG. 5.

FIG. 4 shows that the temple 3 is inserted into the slit 5 of the cavity 4, in order to protrude on the other side, externally to the front 2. At this point, the substantially spherical element 9 is inserted into the hook-shaped portion 6, in particular the partition 10 of the substantially spherical element 9 is accommodated in the cavity 8 of the hook-shaped portion 6, as shown in FIGS. 4 to 6.

Figure 7:
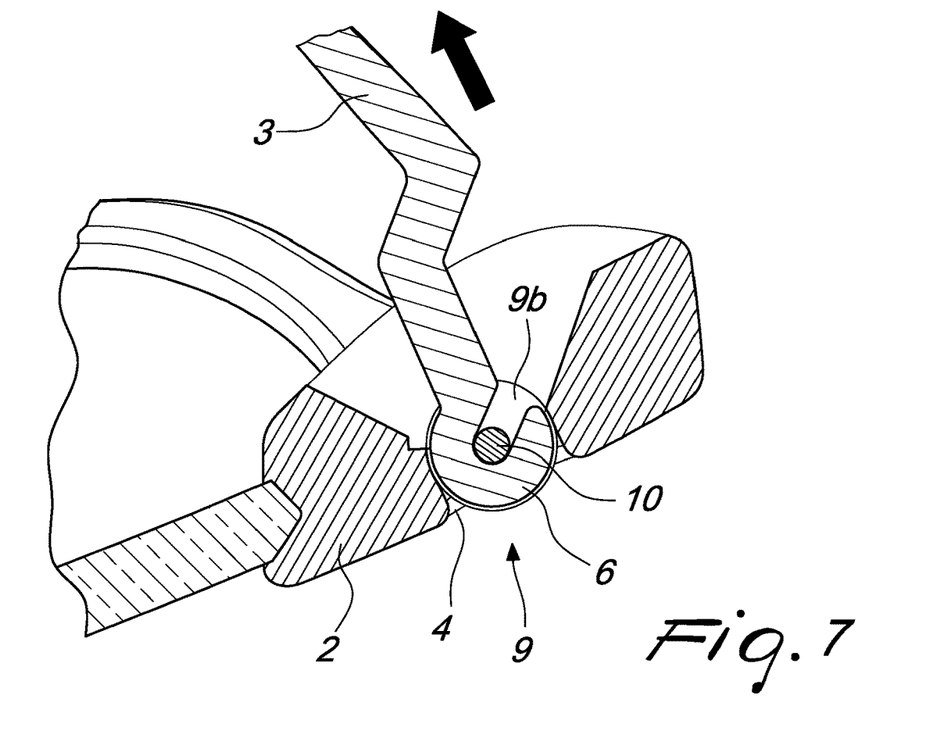
FIG. 7 is a partially cross-sectional perspective view of an additional step of the coupling between the temple and the front of the eyeglasses.
Figure 8:
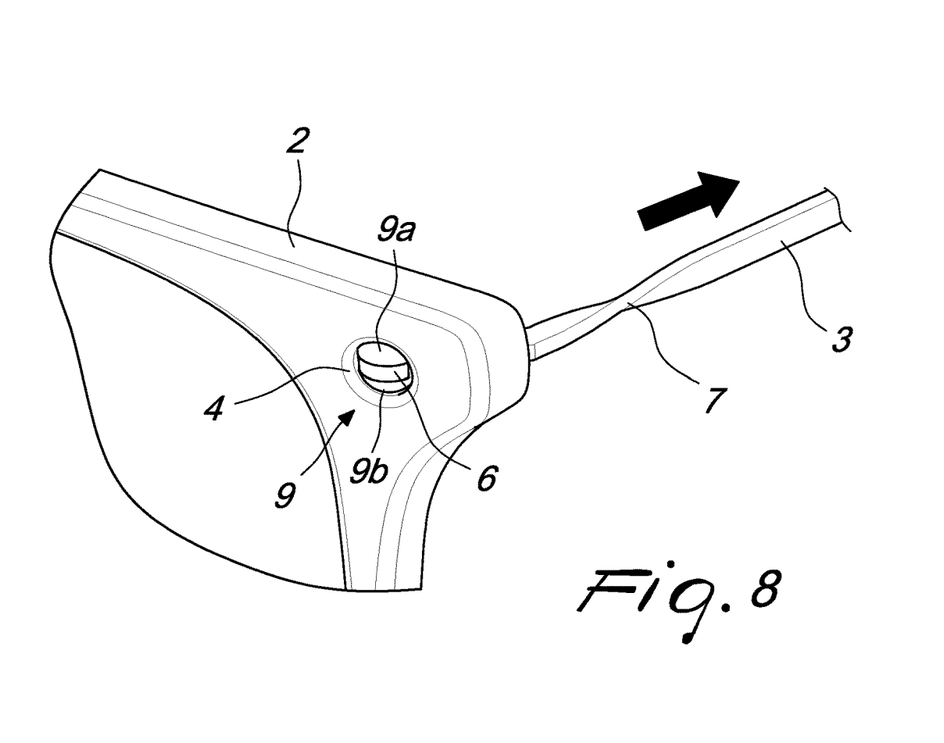
FIG. 8 is a perspective partial view of the coupling of FIG. 7.

Once insertion is complete, the temple 3 is retracted so that the substantially spherical element 9 lies within the cavity 4 of the front 2, in order to reach the configuration shown in FIG. 7. In this condition, the temple is not yet locked in place. The locking in place occurs by rotating the temple about the pin 10.

Figure 9:
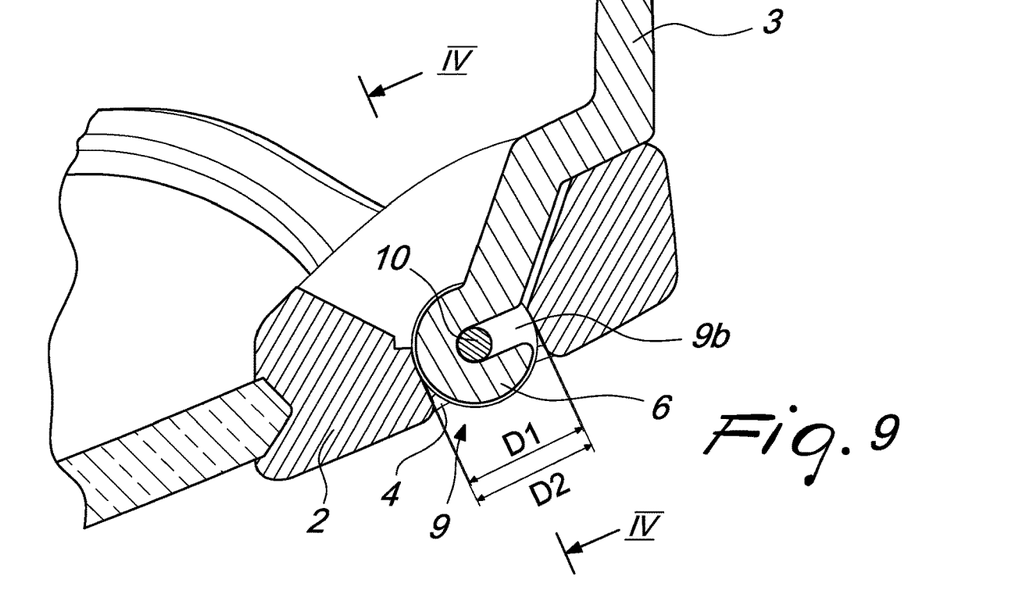
FIG. 9 is a partially cross-sectional perspective view of the final step of the coupling between the temple and the front of the eyeglasses.
Figure 10:
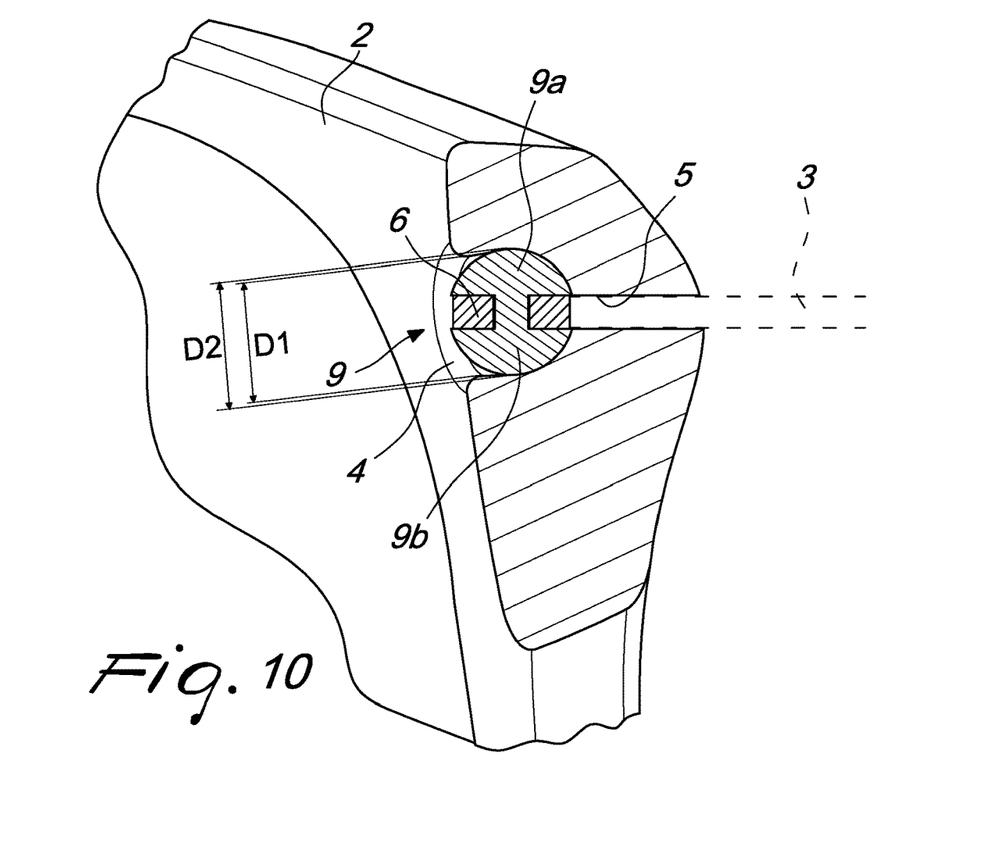
FIG. 10 is an additional cross-sectional perspective partial view of the final step of the coupling between the temple and the front of the eyeglasses.

In this condition, i.e. after having rotated the temple 3, the temple 3 is brought to the position of FIG. 9, in which the profile of the temple 3 coincides with the profile of the front 2 of the eyeglasses, and the temple is therefore in the condition of maximum opening.

Figure 11:
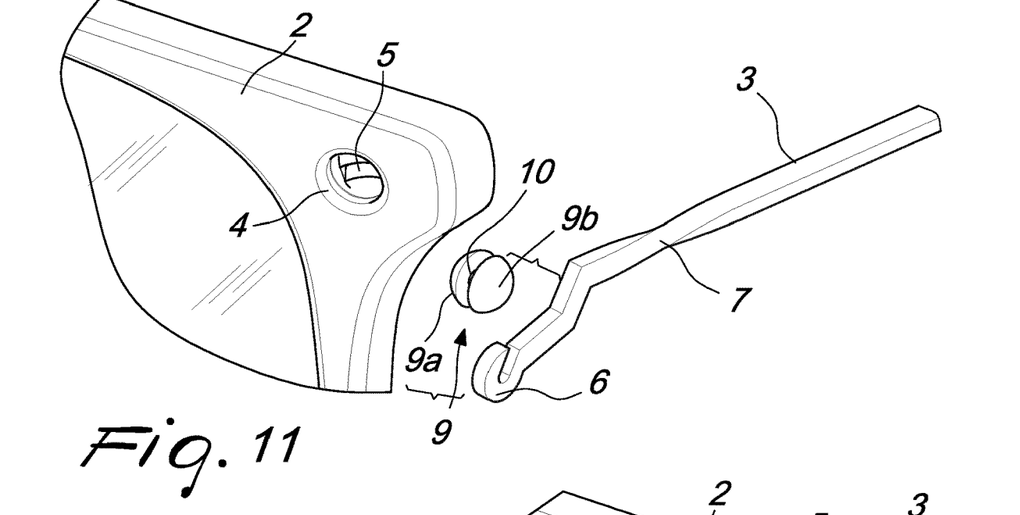
FIG. 11 is an exploded partial perspective view of a second embodiment of the coupling between the temple and the eyeglasses according to the disclosure.
Figure 12:
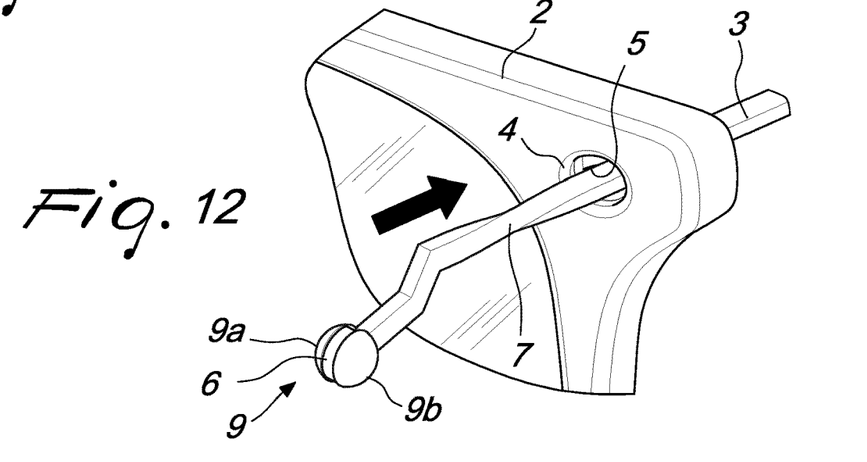
FIG. 12 is a perspective partial view of a first step of the coupling between the temple and the front of the eyeglasses, according to the second embodiment of the disclosure.
Figure 13:
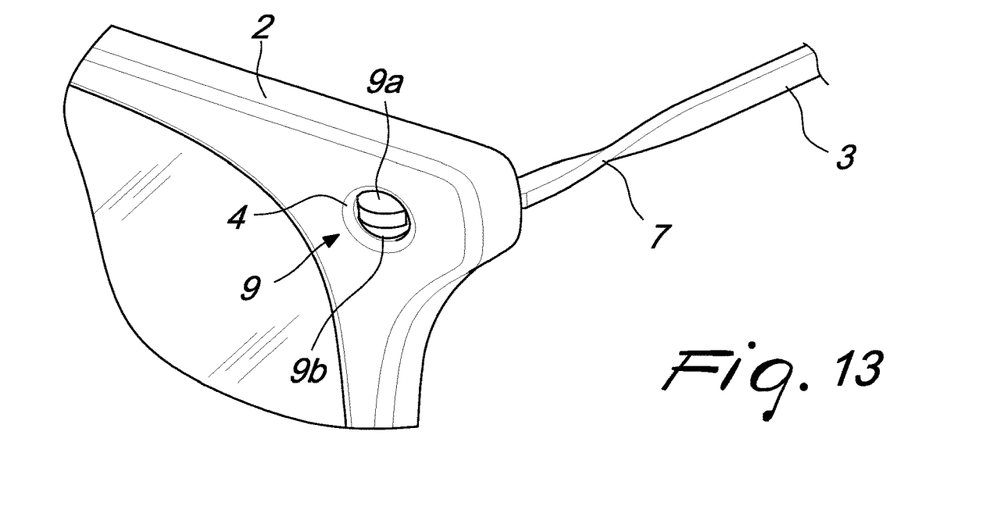
FIG. 13 is a perspective partial view of an additional step of coupling between the temple and the front of the eyeglasses, according to the second embodiment of the disclosure.
Figure 14:
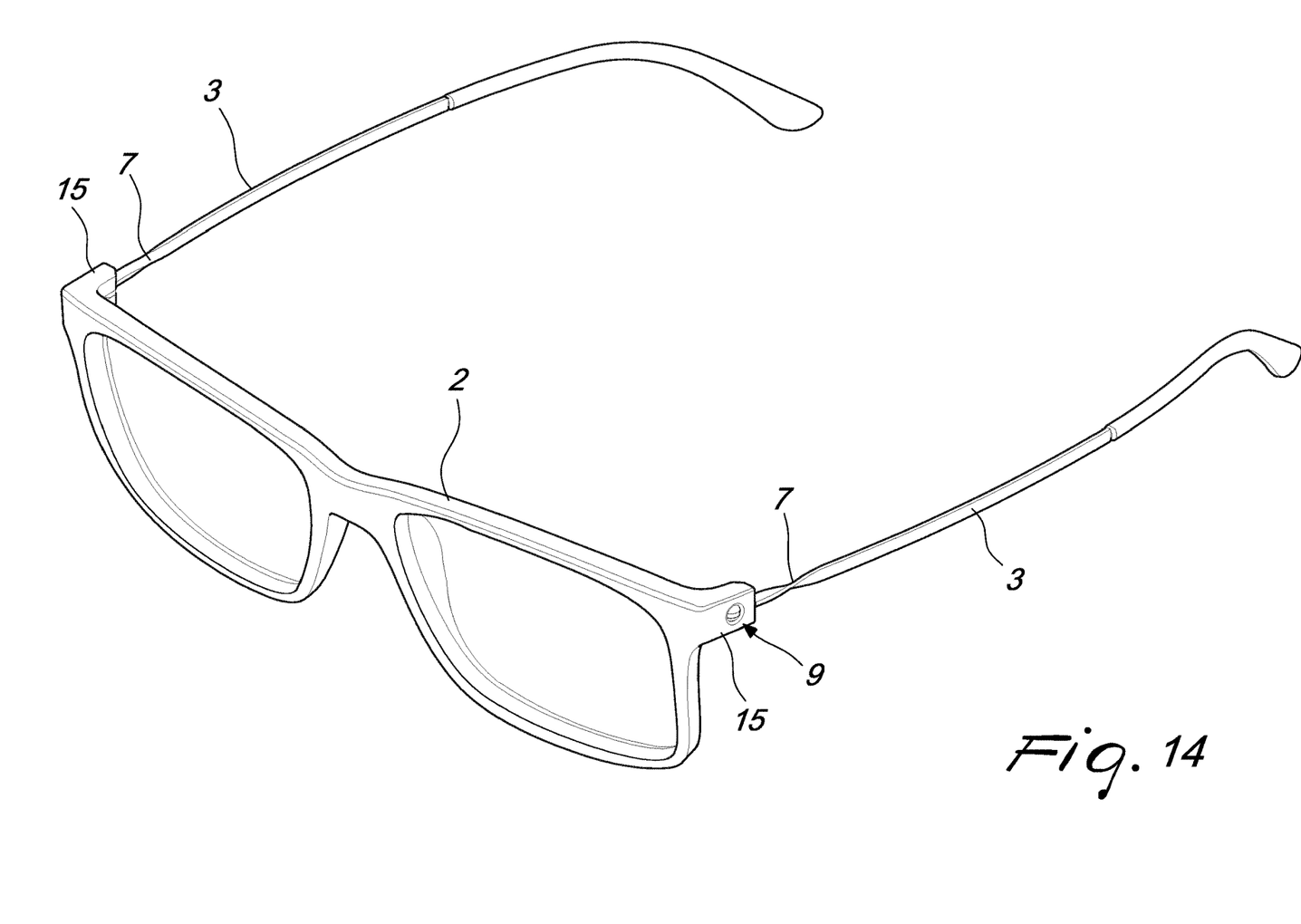
FIG. 14 is a perspective view of the final coupling between the is temple and the front of the eyeglasses according to the second embodiment of the disclosure.
Figure 15:
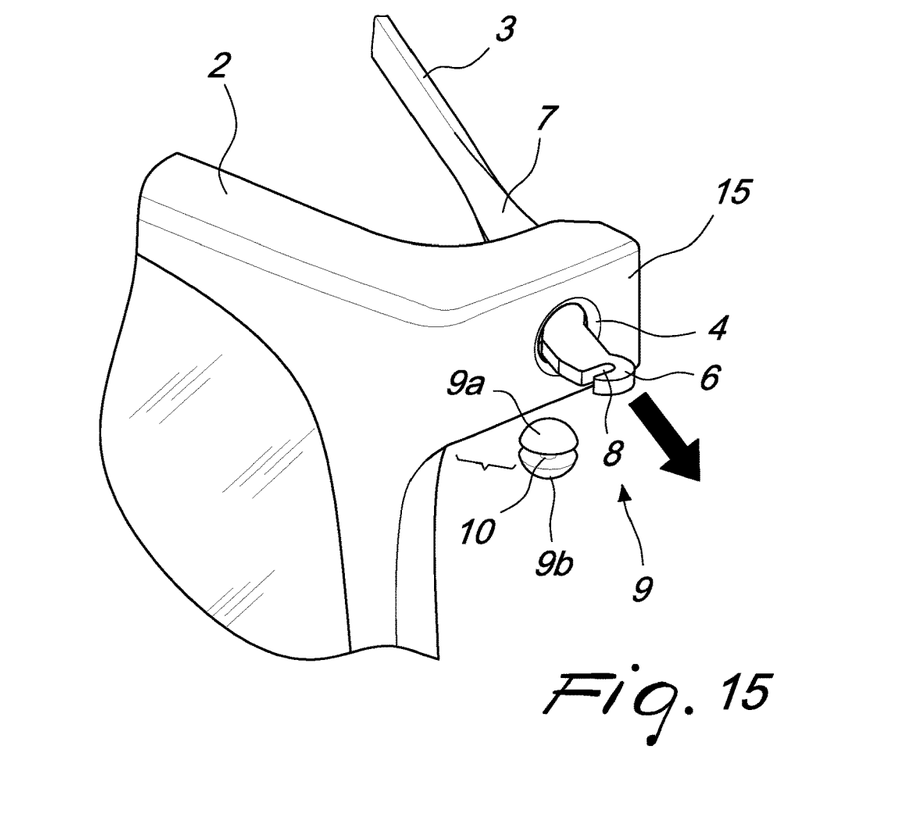
FIG. 15 is an exploded partial perspective view of a third embodiment of the coupling between the temple and the front of the eyeglasses according to the disclosure.
Figure 16:
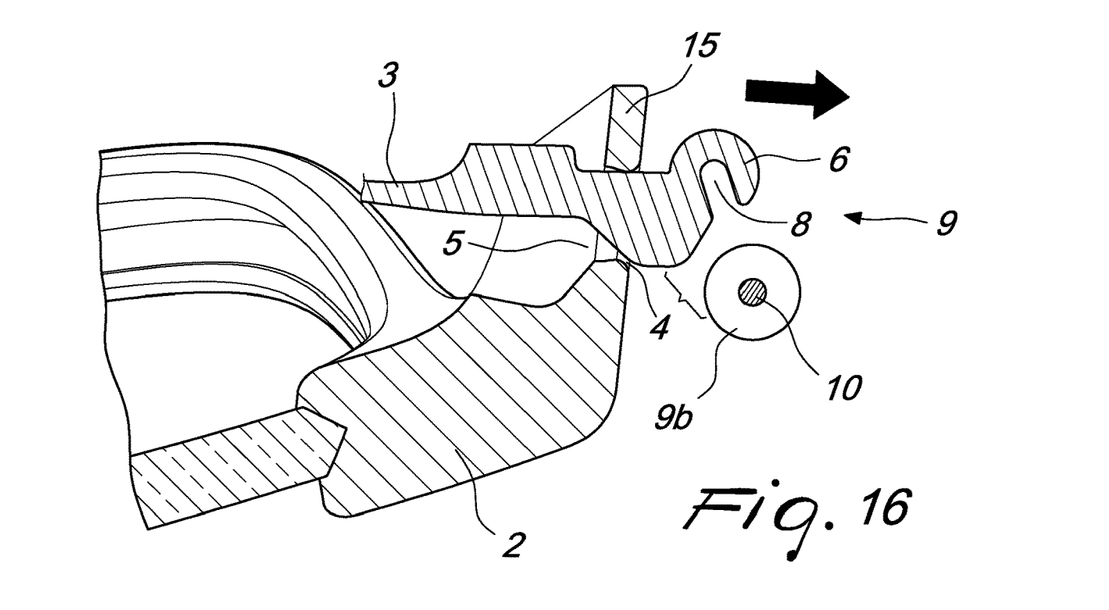
FIG. 16 is a perspective, partial, cross-sectional view of the coupling shown in FIG. 15.
Figure 17:
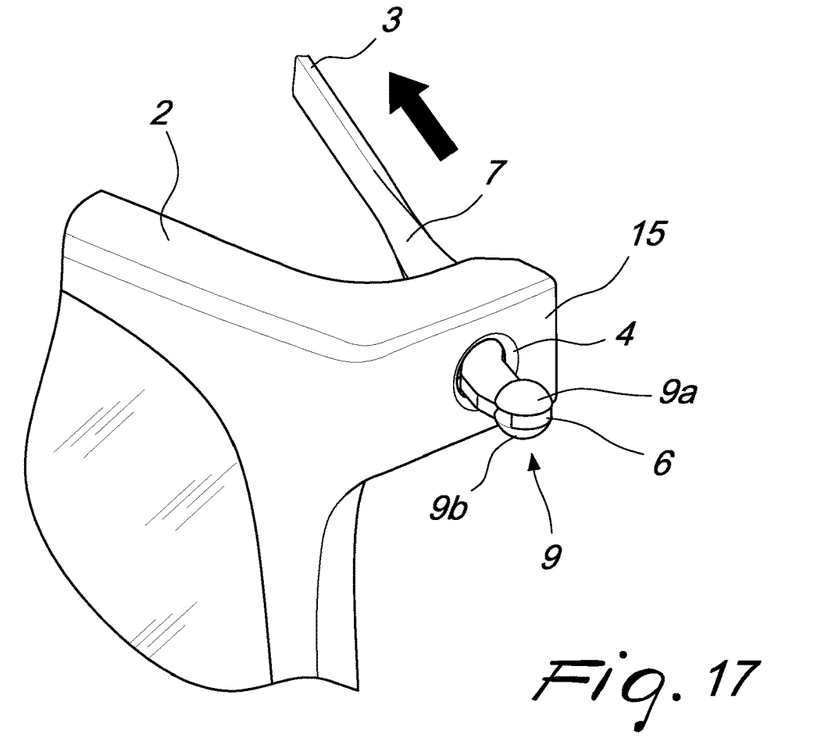
FIG. 17 is a perspective partial view of the second step of coupling between the temple and the front of the eyeglasses, according to the third embodiment of the disclosure.
Figure 18:
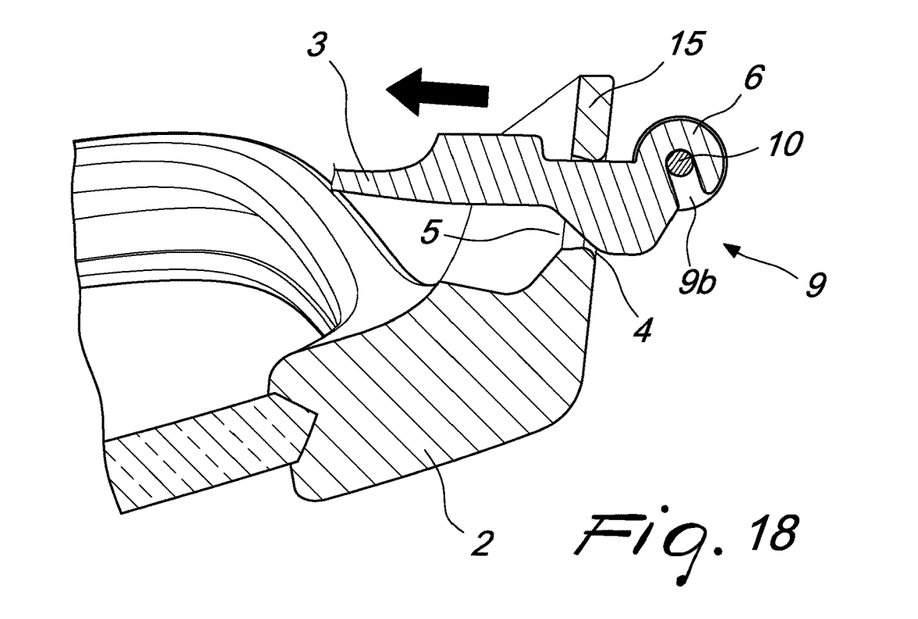
FIG. 18 is a perspective, partial, cross-sectional view of the coupling shown in FIG. 17.
Figure 19:
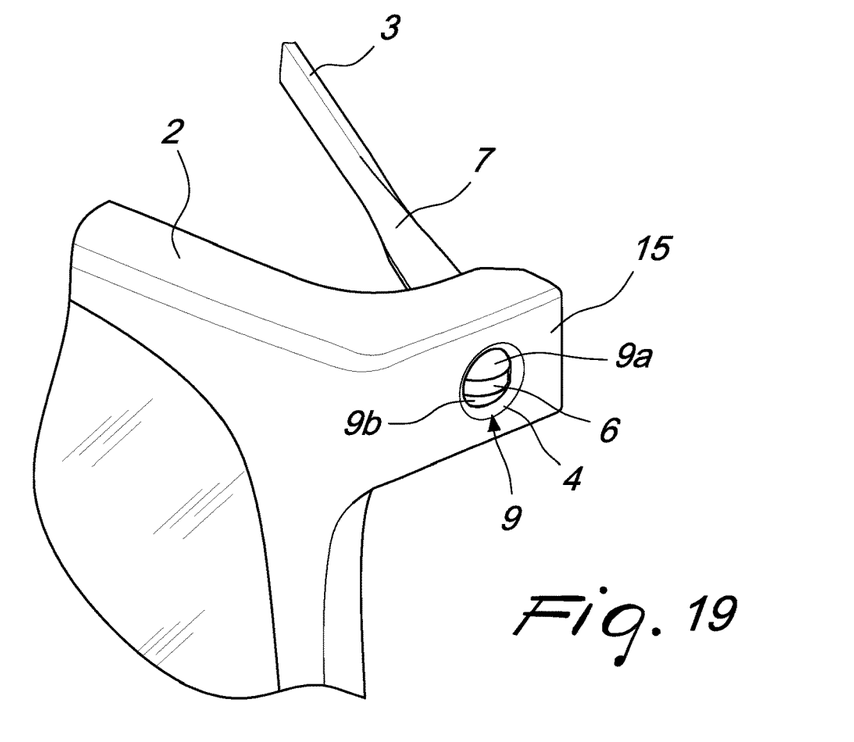
FIG. 19 is a perspective partial view of an additional step of the coupling between the temple and the front of the eyeglasses according to the third embodiment of the disclosure.
Figure 20:
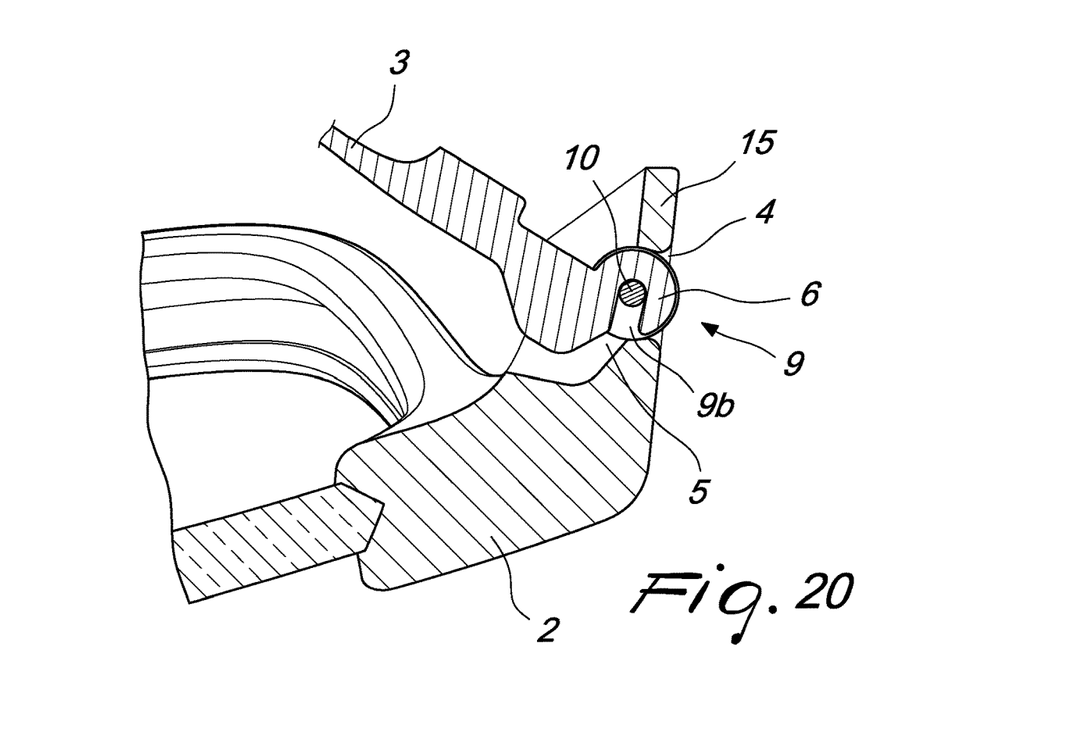
FIG. 20 is a perspective, partial, cross-sectional view of the step of coupling of FIG. 19.
Figure 21:
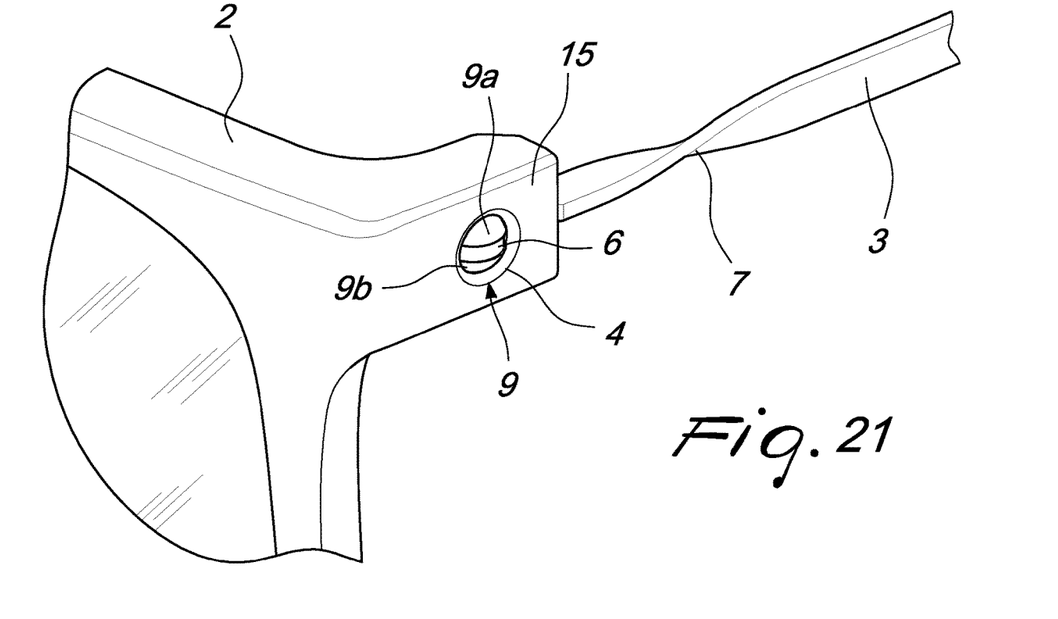
FIG. 21 is a perspective partial view of the final step of coupling between the temple and the front of the eyeglasses, according to the third embodiment of the disclosure.
Figure 22:
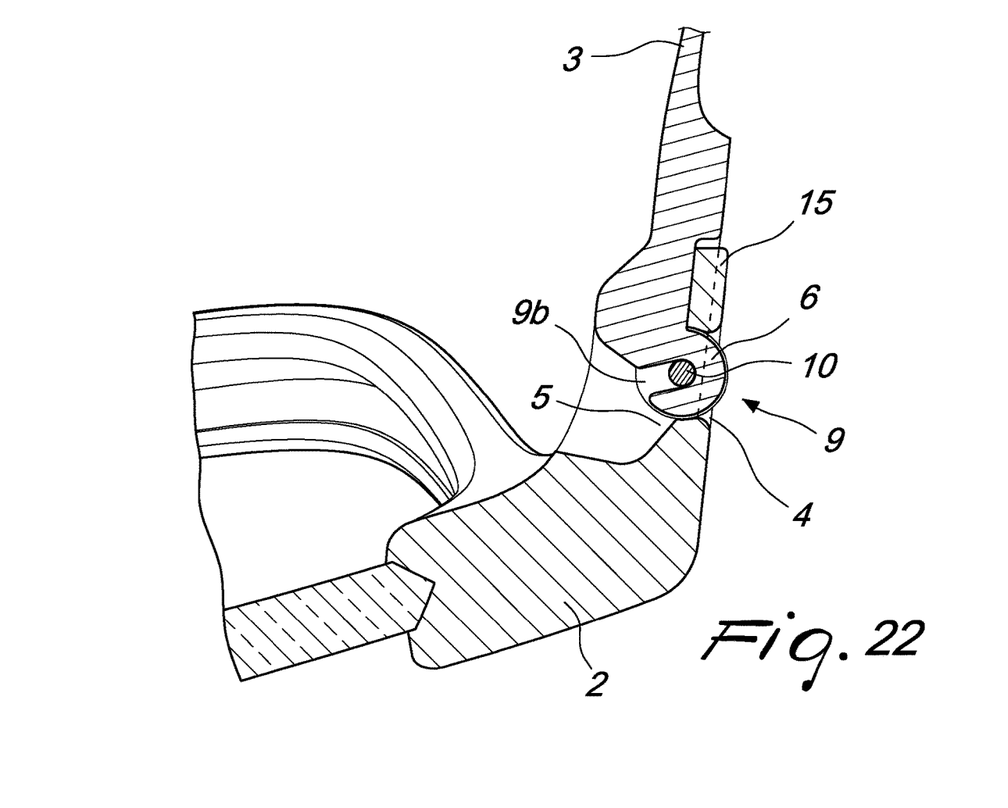
FIG. 22 is a perspective, partial, cross-sectional view of the final step of coupling shown in FIG. 21.

In the second embodiment of the disclosure, illustrated in FIGS. 11 to 13, the substantially spherical element 9 is instead coupled to the hook-shaped portion 6 of the temple 3, before the temple is inserted into the cavity 4 of the front 2 of the eyeglasses.

Once the substantially spherical element 9 is coupled to the hook-shaped portion 6, the temple is fitted, from the front part of the front 2, into the cavity 4 and through the slit 5, as shown in FIG. 12, and is then pulled from the other side until the substantially spherical element 9 is accommodated in the cavity 4 of the front 2 of the eyeglasses.

In the second embodiment the temple 3 and the retention and locking element 9 can be made in a single piece.

The third embodiment of the disclosure, illustrated in FIGS. 14 to 22, is substantially similar to the previous embodiments, with the sole difference that the cavity 4, instead of being defined in the front part of the front 2, is defined in a lateral portion 15 thereof.

Otherwise, both the temple 3 and the substantially spherical element 9 are exactly identical to the previous embodiments, as is the assembly, which follows the steps illustrated for the first embodiment.

In substance, therefore, the eyeglasses with a simplified hinge according to the disclosure have a temple with a hook-shaped end which is adapted to accommodate a substantially spherical element which in turn is adapted to be accommodated in a cavity defined at either the front part of the front of the eyeglasses or at its lateral region.

In all the embodiments the cavity 4 is contoured to have a smaller diameter D1 than the diameter D2 of the substantially spherical element 9, so that the coupling of the element 9 within the cavity 4 occurs by interference fit.

In practice it has been found that the eyeglasses according to the disclosure fully achieves the set aim and advantages, in that it makes it possible to have an extremely simplified assembly of the temple and the front, it being possible to mount the temple with respect to the front without resorting to the use of tools and therefore such operation can be carried out directly by the user, therefore without resorting to specialist technicians.

The eyeglasses thus conceived are susceptible of numerous modifications and variations, all of which are within the scope of the appended claims.

Moreover, all the details may be substituted by other, technically equivalent elements.

In practice, the materials used, as well as the contingent shapes and dimensions, may be any according to the requirements and to the state of the art.

The disclosures in Italian Patent Application No. 102019000012234 from which this application claims priority are incorporated herein by reference.

The invention claimed is:

1. Eyeglasses with a hinge, comprising a front of the eyeglasses and a pair of temples, wherein a circular cavity is defined in said front for accommodating a retention and locking element which is configured to be engaged by a hook-shaped portion of one end of each one of said temples, said retention and locking element being configured to be accommodated in said circular cavity of said front, when said front is coupled to said hook-shaped portion of the temple, configured to couple said temple to said front, wherein said retention and locking element is spherical so as to allow a rotation thereof inside said circular cavity of the front, or a rotation of the temple with respect to the spherical retention and locking element, in order to lock said temple inside said circular cavity.

2. The eyeglasses according to claim 1, wherein said circular cavity is defined in a front region of said front of the eyeglasses.

3. The eyeglasses according to claim 1, wherein said circular cavity is defined in a lateral region of said front of the eyeglasses.

4. The eyeglasses according to claim 1, wherein said retention and locking element is a spherical retention and locking element composed of two hemispheres mutually coupled by a pin, said pin being adapted to be engaged within said hook-shaped portion of said temple.

5. The eyeglasses according to claim 4, wherein said circular cavity for accommodating said spherical retention and locking element has, at a bottom end, a slit for the passage of said temple.

6. The eyeglasses according to claim 1, wherein said temple is twisted on itself so that said hook-shaped portion is defined on a horizontal plane with respect to a vertical plane on which a body of the temple is defined.

7. The eyeglasses according to claim 4, wherein said temple is locked in position by a rotation about said pin of said retention and locking element.

8. The eyeglasses according to claim 1, wherein the end of said temple provided with said hook-shaped portion is shaped to a shape of said front of the eyeglasses.

9. The eyeglasses according to claim 1, wherein a diameter of said circular cavity is smaller than a diameter of said retention and locking element, for an interference coupling between said retention and locking element and said cavity.

10. The eyeglasses according to claim 1, wherein said temple and said retention and locking element are provided in a single piece.

* * * * *